United States Patent
Kaedeoka

(10) Patent No.: US 6,625,401 B2
(45) Date of Patent: Sep. 23, 2003

(54) BATTERY STORING APPARATUS, ELECTRONIC EQUIPMENT AND PHOTOGRAPHING APPARATUS

(75) Inventor: Noriyuki Kaedeoka, Hachioji (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 10/102,929

(22) Filed: Mar. 22, 2002

(65) Prior Publication Data

US 2002/0141756 A1 Oct. 3, 2002

(30) Foreign Application Priority Data

Mar. 28, 2001 (JP) .................................. 2001-092086

(51) Int. Cl.$^7$ .............................................. G03B 17/02
(52) U.S. Cl. .................................... 396/539; 396/277
(58) Field of Search ............................ 396/539, 277–9

(56) References Cited

U.S. PATENT DOCUMENTS 4,645,325 A * 2/1987 Inoue et al. ................. 396/301
5,006,881 A * 4/1991 Kodama ...................... 396/176
5,164,652 A * 11/1992 Johnson et al. ............. 320/106

* cited by examiner

Primary Examiner—Russell Adams
Assistant Examiner—Michelle Nguyen
(74) Attorney, Agent, or Firm—Finnegan, Henderson, Farabow, Garrett & Dunner, L.L.P.

(57) ABSTRACT

There is described a battery storing apparatus for storing two or more types of batteries and easily distinguishing the type of the battery, and an electronic equipment and a digital camera having it. The battery storing apparatus includes a battery storing section being capable of storing more than two types of batteries; a cover member, being capable of opening and closing, to cover the battery storing section; an anode terminal and a cathode terminal, which are provided in an inner side of the battery storing section; a battery contact piece equipped at the cover member and disposed opposite the anode terminal and the cathode terminal; and a battery-type distinguishing section to distinguish a type of the battery by detecting a voltage applied to the battery contact piece through means for electronically connecting with the battery contact piece.

15 Claims, 3 Drawing Sheets

BATTERY STORING APPARATUS, ELECTRONIC EQUIPMENT AND PHOTOGRAPHING APPARATUS

BACKGROUND OF THE INVENTION

The present invention relates to a battery storing apparatus, an electronic equipment, and a digital camera and more particularly to a battery storing apparatus for storing two or more types of batteries and easily distinguishing the type of the battery and an electronic equipment and digital camera having it.

On the market at present, there are many kinds of devices capable of using a plurality of, such as two or more, types of batteries, for example, a digital camera.

The devices are broadly divided into two kinds as follows:
(1) dedicated terminals are respectively provided in correspondence with the battery type and
(2) common terminals are used.

With respect to (1) among them, the art disclosed in Japanese Application Patent Laid-Open Publication No. Hei 11-176404 is known.

In devices capable of using a plurality of, such as two or more, types of batteries like this, when batteries are controlled without recognizing the battery type, a problem arises that control using characteristics of the battery type (for example, battery check) cannot be executed. For example, when battery check is executed without recognizing the battery type, the capacity of each battery cannot be used effectively.

The characteristics are respectively different depending on the battery type like this, so that to use each battery effectively (for example, to use the capacity of each battery effectively), it is desired to control each battery in accordance with the characteristics thereof, thus it is necessary to distinguish the type of each battery to be stored and change the control in accordance with the type. On the other hand, as a distinguishing means for the battery type, when the terminals are different for each battery type, there is a method available for distinguishing the corresponding battery type by detecting the used terminals. Further, there is a method available that the shape of each battery is made different for each battery type and on the basis of the shape distinguished by a means for distinguishing the difference in shape, the battery type is distinguished.

However, in conventional devices having dedicated terminals for each battery type, the number of parts is increased and it is an obstruction factor for reliability, miniaturization, and cost reduction.

Further, in devices for distinguishing differences in the external shape of batteries, device parts for distinguishing the shape and switches for distinguishing are also necessary, and the number of parts is increased due to incorporation of them, and there is the same defect as the aforementioned.

SUMMARY OF THE INVENTION

To overcome the abovementioned drawbacks in conventional equipments, it is an object of the present invention to provide a battery storing apparatus, electronic equipment and a photographing apparatus, which make it possible to easily distinguish two or more types of batteries without employing a large number of new parts.

Accordingly, to overcome the cited shortcomings, the abovementioned object of the present invention can be attained by the apparatus described as follow.
(1) An apparatus for storing a battery, comprising: an anode terminal; a cathode terminal; a battery contact piece disposed in correspondence with the anode terminal and the cathode terminal; a battery-type recognizing section to recognize a type of the battery by detecting a voltage applied to the battery contact piece.
(2) The apparatus of item 1, further comprising: a battery storing section adapted to store the battery, being one of at least two batteries whose battery-types are different each other; wherein the anode terminal, the cathode terminal and the battery contact piece are provided in the battery storing section.
(3) The apparatus of item 2, wherein the battery contact piece is disposed opposite both the anode terminal and the cathode terminal.
(4) The apparatus of item 2, wherein the anode terminal contacts an anode of the battery and the cathode terminal contacts a cathode of the battery so as to enable an electronic power supply from the battery, and when the battery is a combination of element-batteries, the battery contact piece makes it possible to electronically connect the element-batteries each other.
(5) The apparatus of item 2, further comprising: a coupling member electronically coupled to the battery contact piece; wherein the battery-type recognizing section recognizes the type of the battery by detecting the voltage, applied to the battery contact piece, through the coupling member.
(6) The apparatus of item 5, further comprising: a cover member to cover the battery storing section; wherein the anode terminal and the cathode terminal are provided in the battery storing section capable of storing the battery, and the coupling member is an urging member, made of electrically conductive material, for urging the cover member in a direction of either opening or closing the cover member.
(7) The apparatus of item 5, wherein the coupling member is a lead wire.
(8) A photographing apparatus, comprising the apparatus described in anyone of items 1–7. The photographing apparatus is preferably a digital camera.
(9) An electronic equipment, comprising the apparatus described in anyone of items 1–7.

Further, to overcome the abovementioned problems, other battery storing apparatus and a digital camera, embodied in the present invention, will be described as follow:
(10) A battery storing apparatus, characterized by comprising:
a battery storing section being capable of storing more than two types of batteries;
a cover member, being capable of opening and closing, to cover the battery storing section;
an anode terminal and a cathode terminal, which are provided in an inner side of the battery storing section;
a battery contact piece equipped at the cover member and disposed opposite the anode terminal and the cathode terminal; and
a battery-type distinguishing section to distinguish a type of the battery by detecting a voltage applied to the battery contact piece through means for electronically connecting with the battery contact piece.
(11) The battery storing apparatus, recited in item 10, characterized in that the means for electronically connecting with the battery contact piece is an urging member, made of electrically conductive material, for urging the cover member in a direction of either opening or closing the cover member.
(12) The battery storing apparatus, recited in item 10, characterized in that the means for electronically connecting with the battery contact piece is a lead wire.

(13) A digital camera, characterized by comprising:

the battery storing apparatus recited in anyone of items 10–12.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENTS

The embodiment of the present invention will be explained in detail hereunder with reference to the accompanying drawings.

Figure 1:
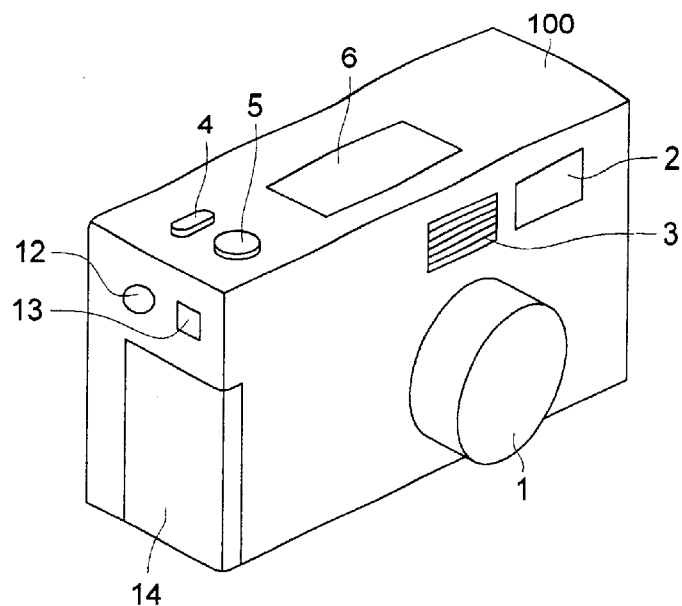
FIG. 1 is a perspective view of a digital camera viewed from the front side.
Figure 2:
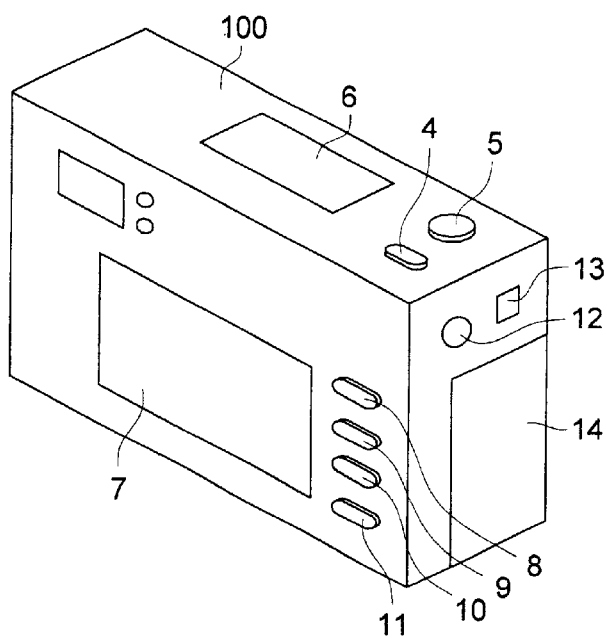
FIG. 2 is a perspective view of a digital camera viewed from the rear side.

FIG. 1 is a perspective view of a digital camera having a battery storage device (serving as a battery storing apparatus) relating to the present invention viewed from the front side and FIG. 2 is a perspective view of it viewed from the rear side.

On the front of a camera body 100, an imaging lens 1 is installed and above the imaging lens 1, a finder 2 and a stroboscope 3 are arranged.

On the top of the camera body 100, a power switch 4 for turning power on or off, a release switch 5 for executing imaging, and an LCD display unit 6 for displaying various information such as the camera state are arranged.

On the rear of the camera body 100, an LCD display unit 7 for displaying an image and switches 8 to 11 for performing various operations are installed.

Further, on the side of the camera body 100, a DC jack 12 for obtaining power from the outside, a terminal 13 for communicating with an external device such as a personal computer, and a cover member 14 for opening or closing the camera body 100 are installed.

Figure 3:
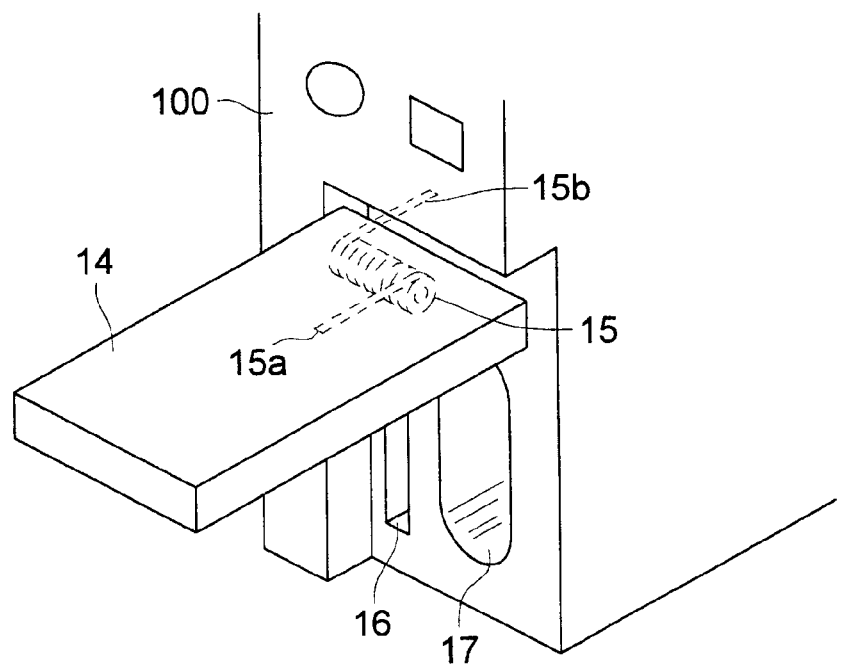
FIG. 3 is a partial perspective view showing the opened state of a cover member.

FIG. 3 is a perspective view showing the opened state of the cover member 14. To change the cover member 14 from the closed state to the open state, it slides firstly in the down direction of the camera body 100 slightly in parallel (a preliminary operation for the open state), is released from the connection with the camera body 100, then opened as shown in the drawing, and put into the open state. And, to change the cover member 14 from the open state to the closed state, when the reverse operation to the aforementioned is performed, the cover member 14 is closed.

Further, on the portion covered by the cover member 14 on the side of the camera body 100, a coil spring 15 which is a pressing means is attached on the upper end side of the cover member 14. The coil spring 15 is made of a metal capable of supplying power, and one end 15a thereof makes contact with the side of the cover member 14, and the other end 15b is fixed on the side of the camera body 100, so that the coil spring 15 always presses the cover member 14 in the direction for opening it. Such a constitution of the cover member is conventionally well-known.

On the portion on the side of the camera body 100 which is covered by the cover member 14, a recording medium storage unit 16 and a battery storage unit 17 in the neighborhood of the recording medium storage unit 16 are installed in parallel and the cover member 14 in the closed state covers the recording medium storage unit 16 and the battery storage unit 17 together.

In the recording medium storage unit 16, a recording medium (not shown in the drawing) is loaded when it is pressed in and locked to the innermost side (the push-in position) by a finger, and when the recording medium is pressed in to the innermost side (the push-in position) again, the recording medium is unlocked, and when the recording medium is pressed out up to the takeout position by a pressing member (not shown in the drawing) installed inside, it can be taken out.

The battery storage unit 17 can store two AA dry batteries having the anode terminal and cathode terminal on the opposite end faces or a battery such as CR-V3 in almost the same shape as that when two AA dry batteries are installed in parallel, having an anode terminal and a cathode terminal only on the surface on one side so that the length direction is the storing direction.

Figure 4:
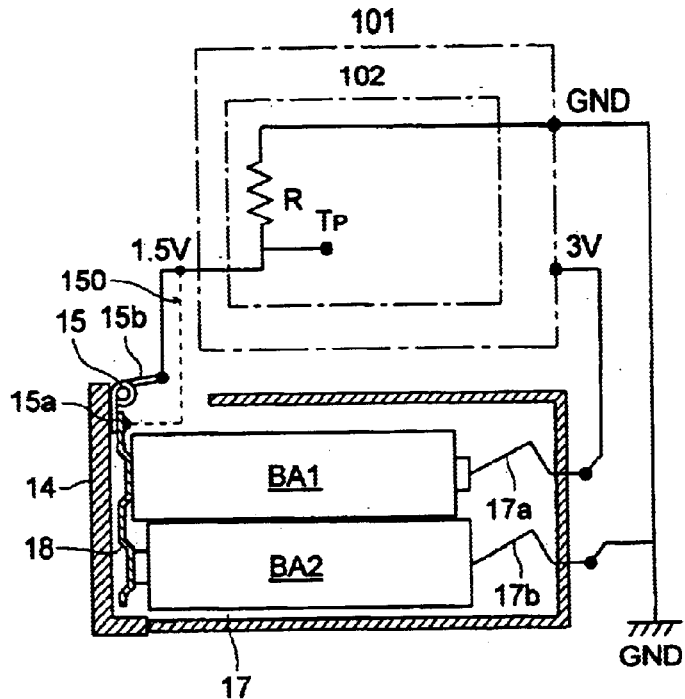
FIGS. 4(A) and 4(B) are cross sectional views respectively for explaining a battery storage device.
Figure 4:
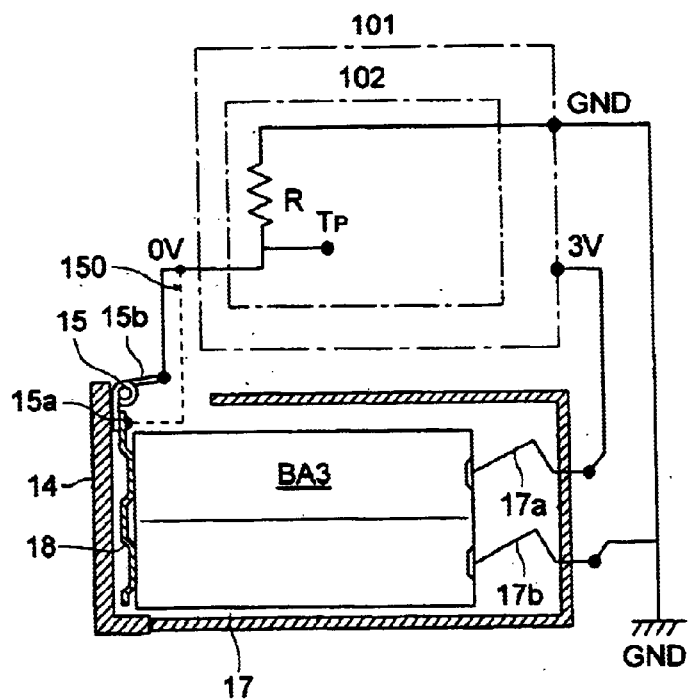

The battery storage device relating to the present invention is shown in detail in FIG. 4. FIG. 4A is a cross section view showing the state that two batteries BA1 and BA2 in a shape that the anode terminal and cathode terminal are installed on both opposite end faces are stored.

Inside the side of the battery storage unit 17, an anode terminal 17a and a cathode terminal 17b for supplying power to the camera body 100 are arranged in contact with the batteries BA1 and BA2 and on the rear of the cover member 14 opposite to the terminals 17a and 17b, a battery contact piece 18 is installed. When the batteries stored in the battery storage unit 17 are two batteries having terminals at both ends shown in the drawing, the battery contact piece 18, when the cover member 14 is put into the closed state, makes electrical contact with the terminals of the batteries and connects them in series.

The anode terminal 17a and the cathode terminal 17b are formed almost in a dogleg shape and given elasticity. When the terminals press the stored batteries BA1 and BA2 in the direction of projecting from the battery storage unit 17 (in the left direction on the drawing) and the cover member 14 is opened, the batteries BA1 and BA2 are projected outside and can be easily taken out and when the batteries BA1 and BA2 to be stored are batteries having terminals at both ends, contact pressure with the battery contact piece 18 on the rear of the cover member 14 is obtained.

The coil spring 15 for pressing the cover member 14 in the open direction is installed so as to be always in electrical contact with the battery contact piece 18 whose one end 15a is arranged on the rear of the cover member 14.

Further, in the camera body 100, a camera control means 101 for driving and controlling each unit is incorporated and driven by power supplied from the two batteries BA1 and BA2.

In the camera control means 101, a battery type distinguishing section 102 is incorporated. One end of the battery type distinguishing section 102 is electrically connected to the other end 15b of the metallic coil spring 15, pressing the cover member 14 in the open direction, on the side of the camera body 100. Therefore, the battery type distinguishing section 102 is electrically connected to the battery contact piece 18 via the coil spring 15. Further, the other end of the battery type distinguishing section 102 is connected to the ground. By doing this, the two batteries BA1 and BA2 are stored in the battery storage unit 17 and when the cover member 14 is closed, voltage is applied to the battery type distinguishing section 102 from the batteries BA1 and BA2 via the coil spring 15.

The battery type distinguishing section 102 is composed of a voltage detection circuit for detecting voltage to be applied to the battery contact piece 18 via the coil spring 15. Assuming that the batteries BA1 and BA2 are 1.5 V respectively, when the batteries BA1 and BA2 are connected in series as shown in the drawing, a voltage of 1.5 V is applied to a resistor R of the battery type distinguishing section 102 via the coil spring 15 and a voltage of 1.5 V is detected in a voltage detection unit Tp.

On the other hand, in place of the tow batteries BA1 and BA2, as shown in FIG. 4B, for example, when a battery BA3 in a shape that it has a terminal only on one side like CR-V3 is stored in the battery storage unit 17 and the cover is closed, the battery contact piece 18 is not in electrical contact with the terminals of the battery BA3, so that no voltage is applied to the battery contact piece 18 and the coil spring 15 and a voltage of 0 V (ground) is applied to the voltage detection unit via the resistor R.

Therefore, the battery type distinguishing section 102 detects the voltage applied via the coil spring 15, thereby can distinguish that, for example, when the detected voltage is 1.5 V, AA dry batteries are stored and when the detected voltage is 0 V, CR☐V3 is stored.

The camera control means 101 changes the control according to the characteristics of the battery type distinguished by the battery type distinguishing section 102. For example, the cameral control means 101 can change the battery check level, output a suitable residual indication and warning indication for each battery type, and effectively use the battery capacity.

The battery type distinguishing section 102 is preferably incorporated in the circuit of the camera control means 101 as shown in the drawing because the use parts can be shared. However, the battery type distinguishing section 102 is not limited to it and it may be structured so as to form separately from the camera control circuit 101 and output distinguished results thereof to the camera control means 101.

In the battery storage device relating to the present invention, the constitution for voltage detection by the battery type distinguishing section 102 is only such that the battery type distinguishing section 102 is electrically connected to the battery contact piece 18 using the metallic coil spring 15 originally incorporated as a component part of the cover member 14 so as to press the cover member 14 in the open direction, so that there is no need at all to newly incorporate a particular mechanical part for distinguishing the battery type. Therefore, great changes in the mechanical structure and a great increase in the number of parts are not required and the battery type can be distinguished easily by a simple constitution.

Further, great changes in the structure are not required for distinguishing the battery type like this and the number of parts can be reduced, so that by incorporating such a battery storage device, a digital camera having a function of distinguishing the battery type can be miniaturized and reduced in cost.

Further, in the above explanation, the coil spring 15 presses the cover member 14 in the open direction, though the coil spring 15 may press the cover member 15 in the closing direction.

Further, the cover member 14 is not limited to the type that the cover member 14 slides in parallel as a preliminary operation at the time of the opening operation and it may be of a just opening and closing type.

Furthermore, the means for electrically connecting the battery type distinguishing section 102 and the battery contact piece 18 is not limited to the metallic coil spring 15. The battery contact piece 18 and the battery type distinguishing section 102 may be electrically connected using a lead wire 150, which is indicated broken lines shown in FIG. 4(A) and FIG. 4(B). Also in this case, the lead wire may be just laid, so that without greatly increasing the number of parts, the battery type can be distinguished easily by a simple constitution.

The battery storage device relating to the present invention is not limited to application to a digital camera as explained above and can be widely applied to a photographing apparatus using two or more types of batteries stored in a battery storage unit including a cover member having a battery contact piece and furthermore to an electronic equipment.

The present invention can provide a battery storing apparatus, an electronic equipment, and a photographing apparatus for easily distinguishing two or more batteries by very few parts.

What is claimed is:

1. An apparatus for storing a battery, comprising:

an anode terminal;

a cathode terminal;

a battery contact piece disposed in correspondence with said anode terminal and said cathode terminal;

a battery-type recognizing section to recognize a type of said battery by detecting a voltage applied to said battery contact piece; and a battery storing section adapted to store said battery, being one of at least two batteries whose battery-types are different from each other;

wherein said anode terminal, said cathode terminal, and said battery contact piece are provided in said battery storing section; and wherein said battery contact piece is disposed opposite both said anode terminal and said cathode terminal.

2. The apparatus of claim 1, wherein said anode terminal contacts an anode of said battery and said cathode terminal contacts a cathode of said battery so as to enable an electronic power supply from said battery, and when said battery is a combination of element-batteries, said battery contact piece makes it possible to electronically connect said element-batteries to each other.

3. The apparatus of claim 1, further comprising:

a coupling member electronically coupled to said battery contact piece;

wherein said battery-type recognizing section recognizes said type of said battery by detecting said voltage, applied to said battery contact piece, through said coupling member.

4. The apparatus of claim 3, further comprising:

a cover member to cover said battery storing section;

wherein said anode terminal and said cathode terminal are provided in said battery storing section capable of storing said battery, and said coupling member is an urging member, made of electrically conductive material, for urging said cover member in a direction of either opening or closing said cover member.

5. The apparatus of claim 3, wherein said coupling member is a lead wire.

6. An electronic equipment, comprising:

a battery storing apparatus;

wherein said battery storing apparatus comprises:
- an anode terminal;
- a cathode terminal;
- a battery contact piece disposed in correspondence with said anode terminal and said cathode terminal;
- a battery-type recognizing section to recognize a type of said battery by detecting a voltage applied to said battery contact piece; and
- a battery storing section adapted to store said battery, being one of at least two batteries whose battery-types are different from each other;

wherein said anode terminal, said cathode terminal, and said battery contact piece are provided in said battery storing section; and wherein said battery contact piece is disposed opposite both said anode terminal and said cathode terminal.

7. The electronic equipment of claim 6, wherein said anode terminal contacts an anode of said battery and said cathode terminal contacts a cathode of said battery so as to enable an electronic power supply from said battery, and when said battery is a combination of element-batteries, said battery contact piece makes it possible to electronically connect said element-batteries to each other.

8. The electronic equipment of claim 6, wherein said battery storing apparatus further comprises:
- a coupling member electronically coupled to said battery contact piece; and wherein said battery-type recognizing section recognizes said type of said battery by detecting said voltage, applied to said battery contact piece, through said coupling member.

9. The electronic equipment of claim 8, wherein said battery storing apparatus further comprises:
- a cover member to cover said battery storing section; and wherein said anode terminal and said cathode terminal are provided in said battery storing section capable of storing said battery, and said coupling member is an urging member, made of electrically conductive material, for urging said cover member in a direction of either opening or closing said cover member.

10. The electronic equipment of claim 8, wherein said coupling member is a lead wire.

11. A photographing apparatus, comprising:

a battery storing apparatus;

wherein said battery storing apparatus comprises:
- an anode terminal;
- a cathode terminal;
- a battery contact piece disposed in correspondence with said anode terminal and said cathode terminal;
- a battery-type recognizing section to recognize a type of said battery by detecting a voltage applied to said battery contact piece; and
- a battery storing section adapted to store said battery, being one of at least two batteries whose battery-types are different from each other;

wherein said anode terminal, said cathode terminal and said battery contact piece are provided in said battery storing section; and wherein said battery contact piece is disposed opposite both said anode terminal and said cathode terminal.

12. The photographing apparatus of claim 11, wherein said anode terminal contacts an anode of said battery and said cathode terminal contacts a cathode of said battery so as to enable an electronic power supply from said battery, and when said battery is a combination of element-batteries, said battery contact piece makes it possible to electronically connect said element-batteries to each other.

13. The photographing apparatus of claim 11, wherein said battery storing apparatus further comprises:
- a coupling member electronically coupled to said battery contact piece; and wherein said battery-type recognizing section recognizes said type of said battery by detecting said voltage, applied to said battery contact piece, through said coupling member.

14. The photographing apparatus of claim 13, wherein said battery storing apparatus further comprises:
- a cover member to cover said battery storing section; and wherein said anode terminal and said cathode terminal are provided in said battery storing section capable of storing said battery, and said coupling member is an urging member, made of electrically conductive material, for urging said cover member in a direction either opening or closing said cover member.

15. The photographing apparatus of claim 13, wherein said coupling member is a lead wire.

* * * * *